United States Patent
Shi

(10) Patent No.: US 9,906,941 B2
(45) Date of Patent: Feb. 27, 2018

(54) METHODS FOR SENDING AND RECEIVING USER SUBSCRIPTION DATA, HSS, AND SGSN

(71) Applicant: Huawei Technologies Co., Ltd., Shenzhen (CN)

(72) Inventor: Shufeng Shi, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 98 days.

(21) Appl. No.: 15/099,307

(22) Filed: Apr. 14, 2016

(65) Prior Publication Data

US 2016/0234676 A1 Aug. 11, 2016

Related U.S. Application Data

(63) Continuation of application No. PCT/CN2014/088751, filed on Oct. 16, 2014.

(30) Foreign Application Priority Data

Oct. 16, 2013 (CN) .......................... 2013 1 0485453

(51) Int. Cl.
  *H04W 4/00* (2009.01)
  *H04W 8/04* (2009.01)
  (Continued)

(52) U.S. Cl.
  CPC ............ *H04W 8/04* (2013.01); *H04Q 3/0045* (2013.01); *H04W 8/10* (2013.01); *H04W 80/04* (2013.01); *H04W 88/005* (2013.01)

(58) Field of Classification Search
  CPC .................................. H04W 8/04; H04W 8/10
  (Continued)

(56) References Cited

U.S. PATENT DOCUMENTS 7,116,990 B2 * 10/2006 Maanoja ............... G01S 5/0268
  455/456.1
8,346,240 B2 * 1/2013 Morales
  Barbosa ............ H04M 3/42357
  455/405

(Continued)

FOREIGN PATENT DOCUMENTS

CN 102792739 A 11/2012
RU 2442298 C2 2/2012
(Continued)

OTHER PUBLICATIONS

3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 11), 3GPP TS 29.272, V11.8.0, pp. 1-120, 3rd Generation Partnership Project, Valbonne, France (Sep. 2013).

(Continued)

*Primary Examiner* — Joshua Schwartz
(74) *Attorney, Agent, or Firm* — Leydig, Voit & Mayer, Ltd.

(57) ABSTRACT

The embodiments of the present application provide a method for sending user subscription data, a method for receiving user subscription data, an HSS, and an SGSN. After receiving a request from an SGSN, the HSS determines whether the user subscription data includes CAMEL service data. If the user subscription data includes the CAMEL service data, the HSS sends the user subscription data to the SGSN by using a Gr interface, or sends non-CAMEL service data in the user subscription data by using the S6d interface and sends the CAMEL service data in the user subscription data by using a Gr interface to the SGSN.

20 Claims, 8 Drawing Sheets

(51) Int. Cl.
*H04Q 3/00* (2006.01)
*H04W 8/10* (2009.01)
*H04W 80/04* (2009.01)
*H04W 88/00* (2009.01)

(58) Field of Classification Search
USPC .............................................. 455/432.1–433
See application file for complete search history.

(56) References Cited

U.S. PATENT DOCUMENTS

| | | | |
|---|---|---|---|
| 8,346,944 B2* | 1/2013 | Bantukul | H04M 7/123 455/412.1 |
| 8,452,278 B2* | 5/2013 | Tian | H04Q 3/0045 455/432.1 |
| 2010/0220662 A1 | 9/2010 | Di et al. | |
| 2011/0170517 A1 | 7/2011 | Bakker et al. | |
| 2011/0171953 A1 | 7/2011 | Faccin et al. | |
| 2012/0120932 A1 | 5/2012 | Liang et al. | |
| 2012/0184266 A1 | 7/2012 | Faccin et al. | |

FOREIGN PATENT DOCUMENTS

| | | |
|---|---|---|
| RU | 2012104535 A | 8/2013 |
| WO | 2010142106 A1 | 12/2010 |
| WO | WO 2012127288 A1 | 9/2012 |

OTHER PUBLICATIONS

"3rd Generation Partnership Project; Technical Specification Group Services and System Aspects; Network architecture (Release 12)," 3GPP TS 23.002, V12.2.0, $3^{rd}$ Generation Partnership Program, Valbonne, France (Jun. 2013).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 11)," 3GPP TS 29.272, V11.8.0, 3GPP TS 23.002, V12.2.0, $3^{rd}$ Generation Partnership Program, Valbonne, France (Sep. 2013).

* cited by examiner

METHODS FOR SENDING AND RECEIVING USER SUBSCRIPTION DATA, HSS, AND SGSN

CROSS-REFERENCE TO RELATED APPLICATIONS

This application is a continuation of International Patent Application No. PCT/CN2014/088751, filed on Oct. 16, 2014, which claims priority to Chinese Patent Application No. 201310485453.3, filed on Oct. 16, 2013, both of which are hereby incorporated by reference in their entireties.

TECHNICAL FIELD

The embodiments of the present disclosure relates to the field of mobile communications technologies, and in particular, to a method for sending user subscription data, a method for receiving user subscription data, an HSS, and an SGSN.

BACKGROUND

To meet a variety of requirements such as broadband services, service quality, and network coverage, the 3GPP launches a completely new evolved network, namely, an evolved packet system (EPS). Referring to FIG. 1, FIG. 1 is a network architecture diagram of the EPS. The EPS includes an evolved UMTS terrestrial radio access network (E-UTRAN), a mobility management entity (MME), a serving gateway (S-GW), a PDN gateway (Packet Data Network Gateway, P-GW), a serving GPRS support node (SGSN), a home subscriber server (HSS), and a policy and charging rules function (PCRF).

The E-UTRAN is used to implement all functions related to radio access in the evolve network. The MME is used to take charge of mobility management on a control plane, including user context management, mobility status management, allocation of a temporary user identity, and the like. The S-GW is a gateway terminated on an E-UTRAN interface, and is used as a user plane anchor between 3GPP access systems. The P-GW is a gateway that terminates a SGi interface towards a packet data network, and is used as a user plane anchor between a 3GPP access system and a non-3GPP access system. The PCRF is used to implement policy control decision and traffic-based charging functions. The HSS is used to store user subscription information. The SGSN is used to implement routing and forwarding, mobility management, session management, user information storage, and the like in a GPRS/UMTS network. In addition, a GSM/EDGE radio access network (GERAN) and a UMTS terrestrial radio access network (UTRAN) in FIG. 1 are used to implement all functions related to radio access in the GPRS/UMTS network.

During evolution of the GPRS network to the EPS, the SGSN evolves from supporting a Gn/Gp interface to supporting an S4 interface, and an interface between the SGSN and the HSS also evolves from a MAP-based Gr interface to an S6d interface supporting Diameter, where the SGSN supporting the Gn/Gp interface is called a Gn/Gp-SGSN. Considering that within a relatively long period, the SGSN in the EPS needs to support access of GPRS users to an EPS network by using the GERAN/UTRAN, the SGSN in the EPS needs to have functions of the Gn/Gp-SGSN in the GPRS network. The GPRS network provides a mechanism for implementing a CAMEL (Customized Applications for Mobile network Enhanced Logic) service, and the Gn/Gp-SGSN may selectively support a CAMEL function. Therefore, when the Gn/Gp-SGSN supports the CAMEL function, the SGSN in the EPS also needs to support the CAMEL function, that is, the SGSN needs to receive user subscription data that is sent by the HSS and includes CAMEL service data.

In a process of implementing the embodiments of the present disclosure, the inventor finds that the conventional art has the following technical problems: When the SGSN in the EPS supports a CAMEL function, because the S6d interface does not support transmission of CAMEL service data, the SGSN acquires all user subscription data from the HSS by using the MAP-based Gr interface. Acquisition of the user subscription data by using the MAP-based Gr interface causes the SGSN not to use the S6d interface, and some optimization procedures defined on the S6d interface for scenarios in which an SGSN and an MME are integrated cannot be implemented.

SUMMARY

In view of this, the embodiments of the present disclosure provides a method for sending user subscription data, a method for receiving user subscription data, an HSS, and an SGSN to solve the problems that acquisition of user subscription data by using a MAP-based Gr interface causes an SGSN not to use an S6d interface and that some optimization procedures defined on the S6d interface for scenarios in which an SGSN and an MME are integrated cannot be implemented in the conventional art. Technical solutions of the embodiments of the present disclosure are as follows:

According to a first aspect, a method for sending user subscription data is provided, including:

when an HSS receives, by using an S6d interface, a request sent by an SGSN for acquiring user subscription data, determining, by the HSS, whether the user subscription data includes CAMEL service data;

if the user subscription data includes the CAMEL service data, sending, by the HSS, the user subscription data to the SGSN by using a Gr interface, or sending non-CAMEL service data in the user subscription data by using the S6d interface and sending the CAMEL service data in the user subscription data by using a Gr interface to the SGSN; and if the user subscription data does not include the CAMEL service data, sending, by the HSS, the user subscription data to the SGSN by using the S6d interface.

In a first possible implementation manner of the first aspect, the request for acquiring user subscription data is a location update request message.

With reference to the first possible implementation manner of the first aspect, in a second possible implementation manner of the first aspect, the sending, by the HSS, the user subscription data to the SGSN by using a Gr interface, includes:

sending, by the HSS, a location update response message to the SGSN by using the S6d interface, where the location update response message carries indication information, where the indication information is used to indicate that the user subscription data includes the CAMEL service data; and sending, by the HSS, the user subscription data that includes the CAMEL service data to the SGSN by using the Gr interface after sending the location update response message.

With reference to the second possible implementation manner of the first aspect, in a third possible implementation manner of the first aspect, the indication information carried in the location update response message is further used to instruct the SGSN to re-send a location update request message by using the Gr interface; and the sending, by the HSS, the user subscription data that includes the CAMEL service data to the SGSN by using the Gr interface after sending the location update response message, includes:

after the location update response message is sent, if the HSS receives the location update request message re-sent by the SGSN by using the Gr interface, sending the user subscription data that includes the CAMEL service data to the SGSN by using the Gr interface.

With reference to the first possible implementation manner of the first aspect, in a fourth possible implementation manner of the first aspect, the sending, by the HSS, non-CAMEL service data in the user subscription data by using the S6d interface and sending the CAMEL service data in the user subscription data by using a Gr interface to the SGSN, includes:

sending, by the HSS, a location update response message to the SGSN by using the S6d interface, where the location update response message carries the non-CAMEL service data in the user subscription data and indication information, where the indication information is used to indicate that the user subscription data includes the CAMEL service data; and sending, by the HSS, the CAMEL service data in the user subscription data to the SGSN by using the Gr interface after sending the location update response message.

With reference to the fourth possible implementation manner of the first aspect, in a fifth possible implementation manner of the first aspect, the indication information carried in the location update response message is further used to instruct the SGSN to re-send a location update request message by using the Gr interface; and the sending, by the HSS, the CAMEL service data in the user subscription data to the SGSN by using the Gr interface after sending the location update response message, includes:

after the location update response message is sent, if the HSS receives the location update request message re-sent by the SGSN by using the Gr interface, sending, by the HSS, the CAMEL service data in the user subscription data to the SGSN by using the Gr interface.

With reference to the fifth possible implementation manner of the first aspect, in a sixth possible implementation manner of the first aspect, the location update request message re-sent by the SGSN by using the Gr interface further carries indication information used to indicate that only the CAMEL service data in the user subscription data is requested.

According to a second aspect, a method for receiving user subscription data is provided, including:

sending, by an SGSN by using an S6d interface, a request for acquiring user subscription data to an HSS;

when the HSS determines that the user subscription data includes CAMEL service data, receiving, by the SGSN, the user subscription data by using a Gr interface, or receiving non-CAMEL service data in the user subscription data by using the S6d interface and receiving the CAMEL service data in the user subscription data by using a Gr interface; and when the HSS determines that the user subscription data does not include the CAMEL service data, receiving, by the SGSN, the user subscription data by using the S6d interface.

In a first possible implementation manner of the second aspect, the request for acquiring user subscription data is a location update request message.

With reference to the first possible implementation manner of the second aspect, in a second possible implementation manner of the second aspect, the receiving, by the SGSN, the user subscription data by using a Gr interface, includes:

receiving, by the SGSN by using the S6d interface, a location update response message sent by the HSS, where the location update response message carries indication information, where the indication information is used to indicate that the user subscription data includes the CAMEL service data; and receiving, by the SGSN by using the Gr interface, the user subscription data that includes the CAMEL service data and is sent by the HSS.

With reference to the second possible implementation manner of the second aspect, in a third possible implementation manner of the second aspect, the indication information carried in the location update response message is further used to instruct the SGSN to re-send a location update request message by using the Gr interface; and the method further includes:

after receiving the location update response message, re-sending, by the SGSN, the location update request message to the HSS by using the Gr interface.

With reference to the first possible implementation manner of the second aspect, in a fourth possible implementation manner of the second aspect, the receiving, by the SGSN, non-CAMEL service data in the user subscription data by using the S6d interface and receiving the CAMEL service data in the user subscription data by using a Gr interface, includes:

receiving, by the SGSN by using the S6d interface, a location update response message sent by the HSS, where the location update response message carries the non-CAMEL service data in the user subscription data and indication information, where the indication information is used to indicate that the user subscription data includes the CAMEL service data; and receiving, by the SGSN by using the Gr interface, the CAMEL service data that is included in the user subscription data and sent by the HSS.

With reference to the fourth possible implementation manner of the second aspect, in a fifth possible implementation manner of the second aspect, the indication information carried in the location update response message is further used to instruct the SGSN to re-send a location update request message by using the Gr interface; and the method further includes:

after receiving the location update response message, re-sending, by the SGSN, the location update request message to the HSS by using the Gr interface.

With reference to the fifth possible implementation manner of the second aspect, in a sixth possible implementation manner of the second aspect, the location update request message re-sent by the SGSN to the HSS by using the Gr interface carries indication information used to indicate that only the CAMEL service data is requested.

According to a third aspect, an HSS is provided, including:

a determining module, configured to: when the HSS receives, by using an S6d interface, a request sent by an SGSN for acquiring user subscription data, determine whether the user subscription data includes CAMEL service data;

a first sending module, configured to: when the user subscription data includes the CAMEL service data, send the user subscription data to the SGSN by using a Gr interface, or send non-CAMEL service data in the user subscription data by using the S6d interface and send the CAMEL service data in the user subscription data by using a Gr interface to the SGSN; and a second sending module, configured to: when the user subscription data does not include the CAMEL service data, send the user subscription data to the SGSN by using the S6d interface.

In a first possible implementation manner of the third aspect, the request for acquiring user subscription data is a location update request message.

With reference to the first possible implementation manner of the third aspect, in a second possible implementation manner of the third aspect, the first sending module includes:

a first sending submodule, configured to send a location update response message to the SGSN by using the S6d interface, where the location update response message carries indication information, where the indication information is used to indicate that the user subscription data includes the CAMEL service data; and a second sending submodule, configured to: after the location update response message is sent, send the user subscription data that includes the CAMEL service data to the SGSN by using the Gr interface.

With reference to the second possible implementation manner of the third aspect, in a third possible implementation manner of the third aspect, the indication information carried in the location update response message is further used to instruct the SGSN to re-send a location update request message by using the Gr interface; and the second sending submodule includes:

a first sending unit, configured to: after the first sending submodule sends the location update response message, if the HSS receives the location update request message re-sent by the SGSN by using the Gr interface, send the user subscription data that includes the CAMEL service data to the SGSN by using the Gr interface.

With reference to the first possible implementation manner of the third aspect, in a fourth possible implementation manner of the third aspect, the first sending module includes:

a third sending submodule, configured to send a location update response message to the SGSN by using the S6d interface, where the location update response message carries the non-CAMEL service data in the user subscription data and indication information, where the indication information is used to indicate that the user subscription data includes the CAMEL service data; and a fourth sending submodule, configured to: after the location update response message is sent, send the CAMEL service data in the user subscription data to the SGSN by using the Gr interface.

With reference to the fourth possible implementation manner of the third aspect, in a fifth possible implementation manner of the third aspect, the indication information carried in the location update response message is further used to instruct the SGSN to re-send a location update request message by using the Gr interface; and the fourth sending submodule includes:

a second sending unit, configured to: after the third sending submodule sends the location update response message, if the HSS receives the location update request message re-sent by the SGSN by using the Gr interface, send the CAMEL service data in the user subscription data to the SGSN by using the Gr interface.

With reference to the fifth possible implementation manner of the third aspect, in a sixth possible implementation manner of the third aspect, the location update request message re-sent by the SGSN by using the Gr interface further carries indication information used to indicate that only the CAMEL service data in the user subscription data is requested.

According to a fourth aspect, an SGSN is provided, including:

a sending module, configured to send, by using an S6d interface, a request for acquiring user subscription data to an HSS;

a first receiving module, configured to: when the HSS determines that the user subscription data includes CAMEL service data, receive the user subscription data by using a Gr interface, or receive non-CAMEL service data in the user subscription data by using the S6d interface and receive the CAMEL service data in the user subscription data by using a Gr interface; and a second receiving module, configured to: when the HSS determines that the user subscription data does not include the CAMEL service data, receive the user subscription data by using the S6d interface.

In a first possible implementation manner of the fourth aspect, the request for acquiring user subscription data is a location update request message.

With reference to the first possible implementation manner of the fourth aspect, in a second possible implementation manner of the fourth aspect, the first receiving module includes:

a first receiving submodule, configured to receive, by using the S6d interface, a location update response message sent by the HSS, where the location update response message carries indication information, where the indication information is used to indicate that the user subscription data includes the CAMEL service data; and a second receiving submodule, configured to receive, by using the Gr interface, the user subscription data that includes the CAMEL service data and is sent by the HSS.

With reference to the second possible implementation manner of the fourth aspect, in a third possible implementation manner of the fourth aspect, the indication information carried in the location update response message is further used to instruct the SGSN to re-send a location update request message by using the Gr interface; and the first receiving module further includes:

a fifth sending submodule, configured to: after the location update response message is received, re-send the location update request message to the HSS by using the Gr interface.

With reference to the first possible implementation manner of the fourth aspect, in a fourth possible implementation manner of the fourth aspect, the first receiving module includes:

a third receiving submodule, configured to receive, by using the S6d interface, a location update response message sent by the HSS, where the location update response message carries the non-CAMEL service data in the user subscription data and indication information, where the indication information is used to indicate that the user subscription data includes the CAMEL service data; and a fourth receiving submodule, configured to receive, by using the Gr interface, the CAMEL service data that is included in the user subscription data and sent by the HSS.

With reference to the fourth possible implementation manner of the fourth aspect, in a fifth possible implementation manner of the fourth aspect, the indication information carried in the location update response message is further used to instruct the SGSN to re-send a location update request message by using the Gr interface; and the first receiving module further includes:

a sixth sending submodule, configured to: after the location update response message is received, re-send the location update request message to the HSS by using the Gr interface.

With reference to the fifth possible implementation manner of the fourth aspect, in a sixth possible implementation manner of the fourth aspect, the location update request message re-sent by the sixth sending submodule to the HSS by using the Gr interface further carries indication information used to indicate that only the CAMEL service data is requested.

The technical solutions have the following beneficial effects:

The embodiments of the present disclosure provides a method for sending user subscription data, a method for receiving user subscription data, an HSS, and an SGSN. An HSS first receives, by using an S6d interface, a request sent by an SGSN for acquiring user subscription data. Considering that the user subscription data may include CAMEL service data or may not include CAMEL service data, and different interfaces may be used in different cases, to fully utilize the S6d interface, after the request is received and before the user subscription data is sent, the HSS first determines whether the user subscription data includes the CAMEL service data, and then sends the user subscription data by selectively using a Gr interface or the S6d interface for different cases. That is, in a case in which the user subscription data does not include the CAMEL service data, the user subscription data is sent by using the S6d interface; in a case in which the user subscription data includes the CAMEL service data, the user subscription data is sent by using the Gr interface, or non-CAMEL service data in the user subscription data is sent by using the S6d interface. Apparently, in this manner, utilization of the S6d interface is greatly improved, and the S6d interface can be fully utilized. Further, some optimization procedures defined on the S6d interface for scenarios in which an SGSN and an MME are integrated can also be implemented.

BRIEF DESCRIPTION OF DRAWINGS

To describe the technical solutions in the embodiments of the present disclosure or in the conventional art more clearly, the following briefly introduces the accompanying drawings required for describing the embodiments or the conventional art. Apparently, the accompanying drawings in the following description show merely the embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
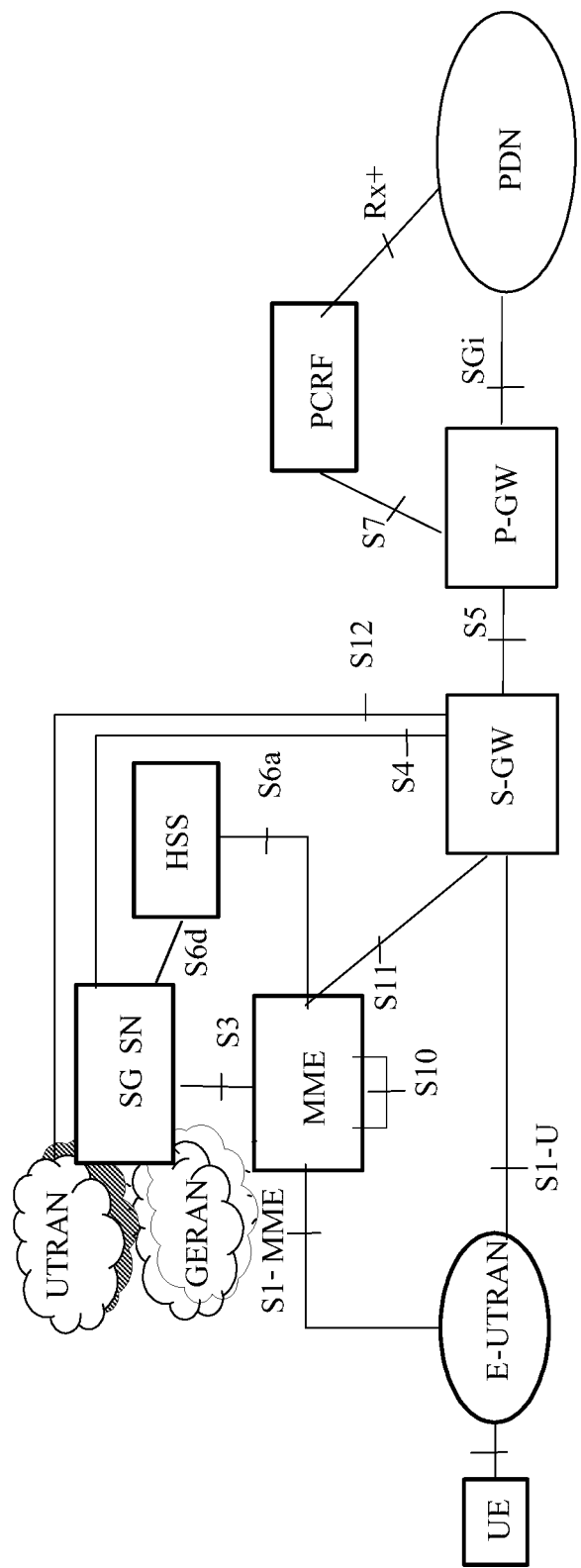
FIG. 1 is a network architecture diagram of an evolved packet system EPS.
Figure 2:
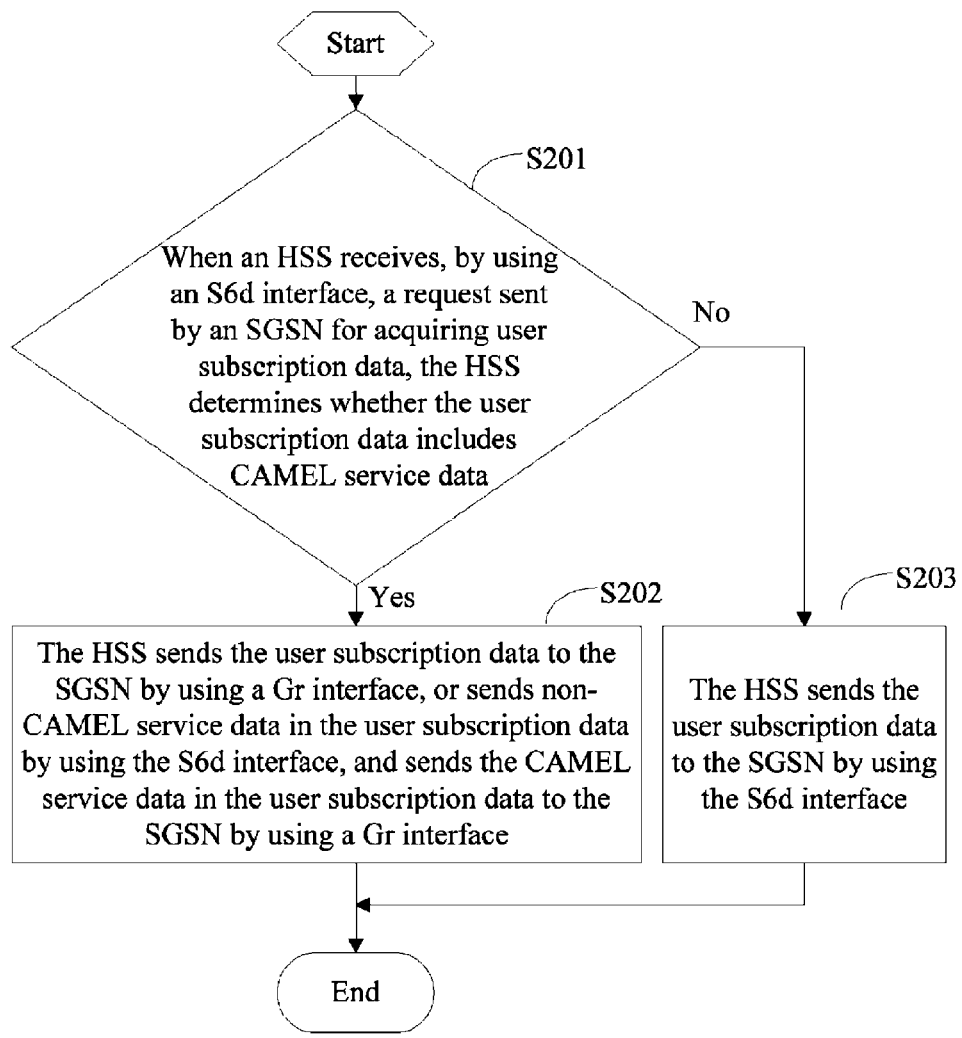
FIG. 2 is a schematic flowchart of a method for sending user subscription data according to an embodiment of the present disclosure.

If the technical solutions of an embodiment of the present disclosure are viewed from a perspective of an HSS side, reference may be made to FIG. 2 that is a schematic flowchart of a method for sending user subscription data according to an embodiment of the present disclosure. The method may include:

Step S201: When an HSS receives, by using an S6d interface, a request sent by an SGSN for acquiring user subscription data, the HSS determines whether the user subscription data includes CAMEL service data.

Step S202: If the user subscription data includes the CAMEL service data, the HSS sends the user subscription data to the SGSN by using a Gr interface, or sends non-CAMEL service data in the user subscription data by using the S6d interface and sends the CAMEL service data in the user subscription data by using a Gr interface to the SGSN.

Step S203: If the user subscription data does not include the CAMEL service data, the HSS sends the user subscription data to the SGSN by using the S6d interface.

In the method for sending user subscription data according to the embodiment of the present disclosure, an HSS first receives, by using an S6d interface, a request sent by an SGSN for acquiring user subscription data. Considering that the user subscription data may include CAMEL service data or may not include CAMEL service data, and different interfaces may be used in different cases, to fully utilize the S6d interface, after the request is received and before the user subscription data is sent, the HSS first determines whether the user subscription data includes the CAMEL service data, and then sends the user subscription data by selectively using a Gr interface or the S6d interface for different cases. That is, in a case in which the user subscription data does not include the CAMEL service data, the user subscription data is sent by using the S6d interface; in a case in which the user subscription data includes the CAMEL service data, the user subscription data is sent by using the Gr interface, or non-CAMEL service data in the user subscription data is sent by using the S6d interface. Apparently, in this manner, utilization of the S6d interface is greatly improved, and the S6d interface can be fully utilized. Further, some optimization procedures defined on the S6d interface for scenarios in which an SGSN and an MME are integrated can also be implemented.

Figure 3:
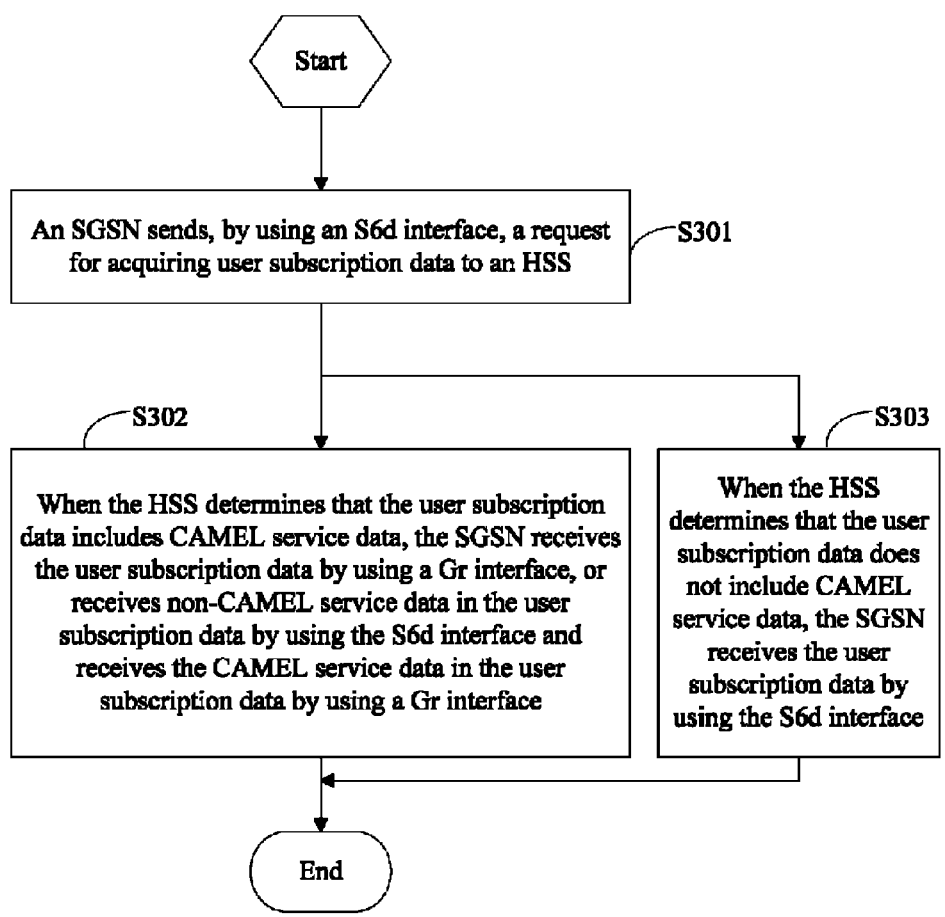
FIG. 3 is a schematic flowchart of a method for receiving user subscription data according to an embodiment of the present disclosure.

Correspondingly, if the technical solutions of an embodiment the present disclosure are viewed from a perspective of an SGSN side, reference may be made to FIG. 3 that is a schematic flowchart of a method for receiving user subscription data according to an embodiment of the present disclosure. The method may include:

Step S301: An SGSN sends, by using an S6d interface, a request for acquiring user subscription data to an HSS.

Step S302: When the HSS determines that the user subscription data includes CAMEL service data, the SGSN receives the user subscription data by using a Gr interface, or receives non-CAMEL service data in the user subscription data by using the S6d interface, and receives the CAMEL service data in the user subscription data by using a Gr interface.

Step S303: When the HSS determines that the user subscription data does not include the CAMEL service data, the SGSN receives the user subscription data by using the S6d interface.

In the method for receiving user subscription data according to the embodiment of the present disclosure, to fully utilize an S6d interface, an SGSN sends, by using the S6d interface, a request for acquiring user subscription data to an HSS. Considering that the user subscription data may include CAMEL service data or may not include CAMEL service data, and different interfaces may be used in different cases, to further fully utilize the S6d interface, in a case in which the user subscription data does not include the CAMEL service data, the user subscription data is received by using the S6d interface; in a case in which the user subscription data includes the CAMEL service data, the user subscription data is received by using a Gr interface, or non-CAMEL service data in the user subscription data is received by using the S6d interface. Apparently, in this manner, utilization of the S6d interface is greatly improved, and the S6d interface can be fully utilized. Further, some optimization procedures defined on the S6d interface for scenarios in which an SGSN and an MME are integrated can also be implemented.

Figure 4:
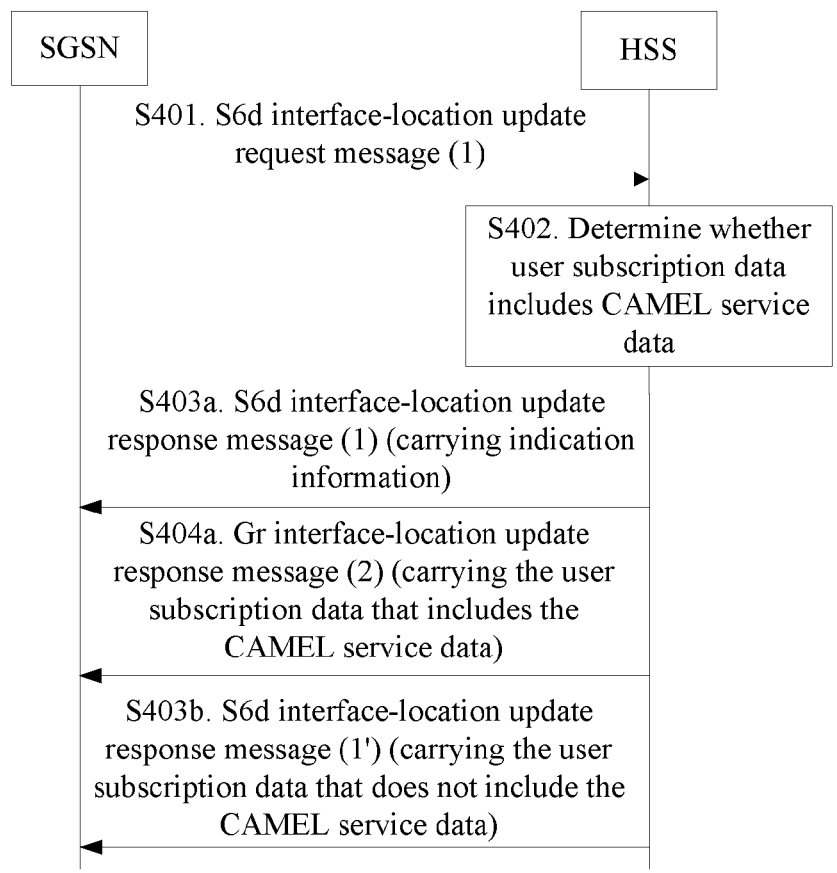
FIG. 4 is a signaling flowchart of a method for sending user subscription data from an HSS side to an SGSN side according to an embodiment of the present disclosure.

On a basis of the foregoing embodiments, the following describes in detail, by using signaling interaction between an HSS and an SGSN, how user subscription data is sent from an HSS side to an SGSN side in the technical solutions of the embodiments of the present disclosure. FIG. 4 shows a signaling flowchart of a method for sending user subscription data from an HSS side to an SGSN side. The method may include:

Step S401: An SGSN sends a location update request message (1) to an HSS by using an S6d interface.

The SGSN requests to acquire user subscription data from the HSS by sending the location update request message (1) to the HSS.

Preferably, the SGSN indicates, in the location update request message (1), whether the SGSN supports a CAMEL service.

Step S402: When the HSS receives the location update request message (1) sent by the SGSN, the HSS determines whether user subscription data includes CAMEL service data.

If the current SGSN supports the CAMEL service, it indicates that the user subscription data to be sent to the SGSN may include the CAMEL service data or may not include the CAMEL service data. The HSS needs to further determine whether the user subscription data to be sent to the SGSN includes the CAMEL service data. If the current SGSN does not support the CAMEL service, it indicates that the user subscription data to be sent to the SGSN does not include the CAMEL service data. In this case, the HSS may directly send the user subscription data to the SGSN by using the S6d interface.

It should be noted that the technical solutions of the embodiments of the present disclosure are concerned only about the case in which the SGSN supports the CAMEL service.

Step S403a: When the user subscription data includes the CAMEL service data, the HSS sends a location update response message (1) to the SGSN by using the S6d interface, where the location update response message (1) carries indication information.

The indication information is used to indicate that the user subscription data includes the CAMEL service data.

Step S404a: After sending the location update response message (1), the HSS sends a location update response message (2) to the SGSN by using a Gr interface, where the location update response message (2) carries the user subscription data that includes the CAMEL service data.

Step S403b: When the user subscription data does not include the CAMEL service data, the HSS sends a location update response message (1') to the SGSN by using the S6d interface, where the location update response message (1') carries the user subscription data.

In a possible implementation manner, that the HSS sends the CAMEL service data in the user subscription data to the SGSN by using the Gr interface is that the HSS sends an insert subscriber data request message to the SGSN by using the Gr interface, where the insert subscriber data request message carries the user subscription data that includes the CAMEL service data; and the SGSN sends an insert subscriber data response message to the HSS after receiving the insert subscriber data request message sent by the HSS. The HSS may send the user subscription data by using multiple insert subscriber data request messages. After the HSS receives a last insert subscriber data response message, a data sending procedure ends.

In addition, when CAMEL service data in the HSS is updated, the HSS sends insert subscriber data request message that carries updated CAMEL service data to the SGSN by using the Gr interface, so that the SGSN updates the CAMEL service data.

In the method for sending user subscription data from an HSS side to an SGSN side according to the embodiment of the present disclosure, an HSS first receives, by using an S6d interface, a location update request message sent by an SGSN. Considering that the user subscription data may include CAMEL service data or may not include CAMEL service data, and different interfaces may be used in different cases, to fully utilize the S6d interface, after the message is received and before the user subscription data is sent, the HSS first determines whether the user subscription data includes the CAMEL service data, and then sends the user subscription data by selectively using a Gr interface or the S6d interface for different cases. That is, in a case in which the user subscription data does not include the CAMEL service data, the user subscription data is sent by using the S6d interface; in a case in which the user subscription data includes the CAMEL service data, the user subscription data is sent by using the Gr interface. Apparently, in this manner, utilization of the S6d interface is greatly improved, and the S6d interface can be fully utilized. Further, some optimization procedures defined on the S6d interface for scenarios in which an SGSN and an MME are integrated can also be implemented.

Figure 5:
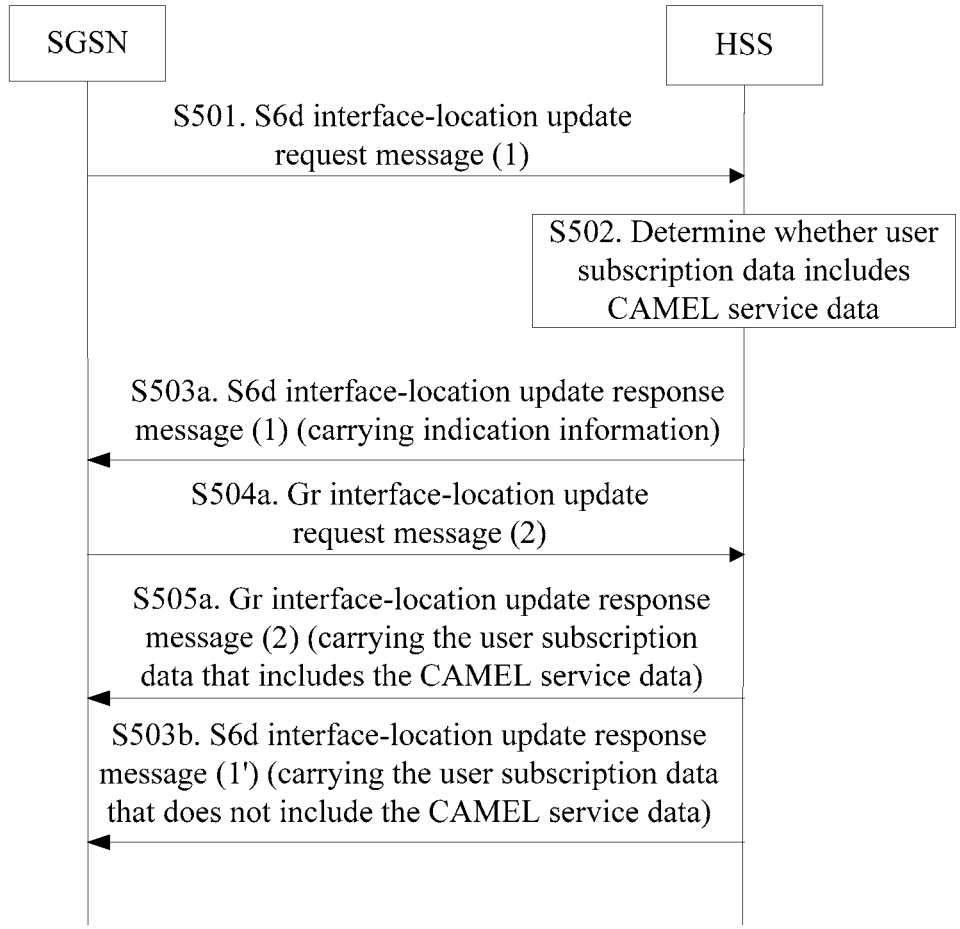
FIG. 5 is another signaling flowchart of a method for sending user subscription data from an HSS side to an SGSN side according to an embodiment of the present disclosure.

FIG. 5 shows a signaling flowchart of another method for sending user subscription data from an HSS side to an SGSN side in the technical solutions of an embodiment of the present disclosure. The method may include:

Step S501: An SGSN sends a location update request message (1) to an HSS by using an S6d interface.

The SGSN requests to acquire user subscription data from the HSS by sending the location update request message (1) to the HSS.

Preferably, the SGSN indicates, in the location update request message (1), whether the SGSN supports a CAMEL service.

Step S502: When the HSS receives the location update request message (1) sent by the SGSN, the HSS determines whether user subscription data includes CAMEL service data.

If the current SGSN supports the CAMEL service, it indicates that the user subscription data to be sent to the SGSN may include the CAMEL service data or may not include the CAMEL service data. The HSS needs to further determine whether the user subscription data to be sent to the SGSN includes the CAMEL service data. If the current SGSN does not support the CAMEL service, it indicates that the user subscription data to be sent to the SGSN does not include the CAMEL service data. In this case, the HSS may directly send the user subscription data to the SGSN by using the S6d interface.

It should be noted that the technical solutions of the embodiments of the present disclosure are concerned only about the case in which the SGSN supports the CAMEL service.

Step S503a: When the user subscription data includes the CAMEL service data, the HSS sends a location update response message (1) to the SGSN by using the S6d interface, where the location update response message (1) carries indication information.

The indication information is used to indicate that the user subscription data includes the CAMEL service data, and instruct the SGSN to re-send a location update request message by using a Gr interface.

Step S504a: The SGSN re-sends a location update request message (2) by using a Gr interface.

Step S505a: The HSS sends a location update response message (2) to the SGSN by using the Gr interface after receiving the location update request message (2) re-sent by the SGSN, where the location update response message (2) carries the user subscription data that includes the CAMEL service data.

Step S503b: When the user subscription data does not include the CAMEL service data, the HSS sends a location update response message (1') to the SGSN by using the S6d interface, where the location update response message (1') carries the user subscription data.

In a possible implementation manner, that the HSS sends the CAMEL service data in the user subscription data to the SGSN by using the Gr interface is that the HSS sends an insert subscriber data request message to the SGSN by using the Gr interface, where the insert subscriber data request message carries the user subscription data that includes the CAMEL service data; and the SGSN sends an insert subscriber data response message to the HSS after receiving the insert subscriber data request message sent by the HSS. The HSS may send the user subscription data by using multiple insert subscriber data request messages. After the HSS receives a last insert subscriber data response message, a data sending procedure ends.

In addition, when CAMEL service data in the HSS is updated, the HSS sends insert subscriber data request message that carries updated CAMEL service data to the SGSN by using the Gr interface, so that the SGSN updates the CAMEL service data.

In the method for sending user subscription data from an HSS side to an SGSN side according to the embodiment of the present disclosure, an HSS first receives, by using an S6d interface, a location update request message sent by an SGSN. Considering that the user subscription data may include CAMEL service data or may not include CAMEL service data, and different interfaces may be used in different cases, to fully utilize the S6d interface, after the message is received and before the user subscription data is sent, the HSS first determines whether the user subscription data includes the CAMEL service data, and then sends the user subscription data by selectively using a Gr interface or the S6d interface for different cases. That is, in a case in which the user subscription data does not include the CAMEL service data, the user subscription data is sent by using the S6d interface; in a case in which the user subscription data includes the CAMEL service data, the user subscription data is sent by using the Gr interface. Apparently, in this manner, utilization of the S6d interface is greatly improved, and the S6d interface can be fully utilized. Further, some optimization procedures defined on the S6d interface for scenarios in which an SGSN and an MME are integrated can also be implemented.

Figure 6:
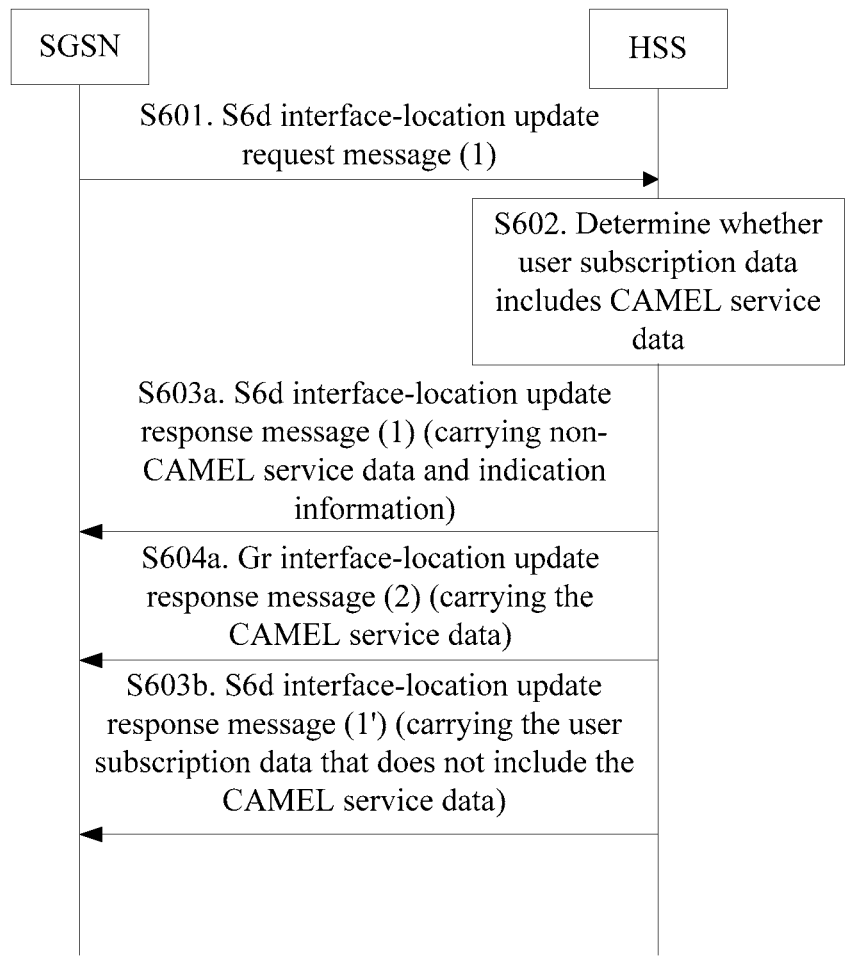
FIG. 6 is another signaling flowchart of a method for sending user subscription data from an HSS side to an SGSN side according to an embodiment of the present disclosure.

FIG. 6 shows a signaling flowchart of another method for sending user subscription data from an HSS side to an SGSN side in the technical solutions of an embodiment the present disclosure. The method may include:

Step S601: An SGSN sends a location update request message (1) to an HSS by using an S6d interface.

The SGSN requests to acquire user subscription data from the HSS by sending the location update request message (1) to the HSS.

Preferably, the SGSN indicates, in the location update request message (1), whether the SGSN supports a CAMEL service.

Step S602: When the HSS receives the location update request message (1) sent by the SGSN, the HSS determines whether user subscription data includes CAMEL service data.

If the current SGSN supports the CAMEL service, it indicates that the user subscription data to be sent to the SGSN may include the CAMEL service data or may not include the CAMEL service data. The HSS needs to further determine whether the user subscription data to be sent to the SGSN includes the CAMEL service data. If the current SGSN does not support the CAMEL service, it indicates that the user subscription data to be sent to the SGSN does not include the CAMEL service data. In this case, the HSS may directly send the user subscription data to the SGSN by using the S6d interface.

It should be noted that the technical solutions of the embodiments of the present disclosure are concerned only about the case in which the SGSN supports the CAMEL service.

Step S603a: When the user subscription data includes the CAMEL service data, the HSS sends a location update response message (1) to the SGSN by using the S6d interface, where the location update response message (1) carries non-CAMEL service data in the user subscription data.

The location update response message (1) may further carry indication information, where the indication information is used to indicate that the user subscription data includes the CAMEL service data.

It should be noted that in this embodiment, the location update response message sent by the HSS by using the S6d interface may carry only the non-CAMEL service data. In the SGSN, it is preset that if an insert subscriber data request message sent by the HSS by using a Gr interface and carrying the CAMEL service data is received after the location update response message is received by using the S6d interface, the request message cannot be rejected, and the CAMEL service data is used as a part of the user subscription data. In another possible implementation manner, the location update response message sent by the HSS by using the S6d interface further carries the indication information in addition to the non-CAMEL service data in the user subscription data. The indication information is used to indicate that the user subscription data includes the CAMEL service data. The SGSN may know, according to the indication information, that the HSS will send the CAMEL service data by using the Gr interface.

Step S604a: After sending the location update response message (1), the HSS sends a location update response message (2) to the SGSN by using a Gr interface, where the location update response message (2) carries the CAMEL service data in the user subscription data.

In this embodiment, the HSS first sends the non-CAMEL service data in the user subscription data by using the S6d interface, and then sends the CAMEL service data in the user subscription data to the SGSN by using the Gr interface. It should be noted that this embodiment is not limited thereto, that is, the HSS may first send the CAMEL service data in the user subscription data by using the Gr interface, and then send the non-CAMEL service data in the user subscription data to the SGSN by using the S6d interface.

Step S603b: When the user subscription data does not include the CAMEL service data, the HSS sends a location update response message (1') to the SGSN by using the S6d interface, where the location update response message (1') carries the user subscription data.

In a possible implementation manner, that the HSS sends the CAMEL service data in the user subscription data to the SGSN by using the Gr interface is that the HSS sends an insert subscriber data request message to the SGSN by using the Gr interface, where the insert subscriber data request message carries the CAMEL service data in the user subscription data. The SGSN sends an insert subscriber data response message to the HSS after receiving the insert subscriber data request message sent by the HSS. The HSS may send the user subscription data by using multiple insert subscriber data request messages. After the HSS receives a last insert subscriber data response message, a data sending procedure ends.

In addition, when CAMEL service data in the HSS is updated, the HSS sends insert subscriber data request message that carries updated CAMEL service data to the SGSN by using the Gr interface, so that the SGSN updates the CAMEL service data.

In the method for sending user subscription data from an HSS side to an SGSN side according to the embodiment of the present disclosure, an HSS first receives, by using an S6d interface, a location update request message sent by an SGSN. Considering that the user subscription data may include CAMEL service data or may not include CAMEL service data, and different interfaces may be used in different cases, to fully utilize the S6d interface, after the message is received and before the user subscription data is sent, the HSS first determines whether the user subscription data includes the CAMEL service data, and then sends the user subscription data by selectively using a Gr interface or the S6d interface for different cases. That is, in a case in which the user subscription data does not include the CAMEL service data, the user subscription data is sent by using the S6d interface; in a case in which the user subscription data includes the CAMEL service data, non-CAMEL service data in the user subscription data is sent by using the S6d interface, and the CAMEL service data in the user subscription data is sent by using the Gr interface. Apparently, in this manner, utilization of the S6d interface is greatly improved, and the S6d interface can be fully utilized. Further, some optimization procedures defined on the S6d interface for scenarios in which an SGSN and an MME are integrated can also be implemented.

Figure 7:
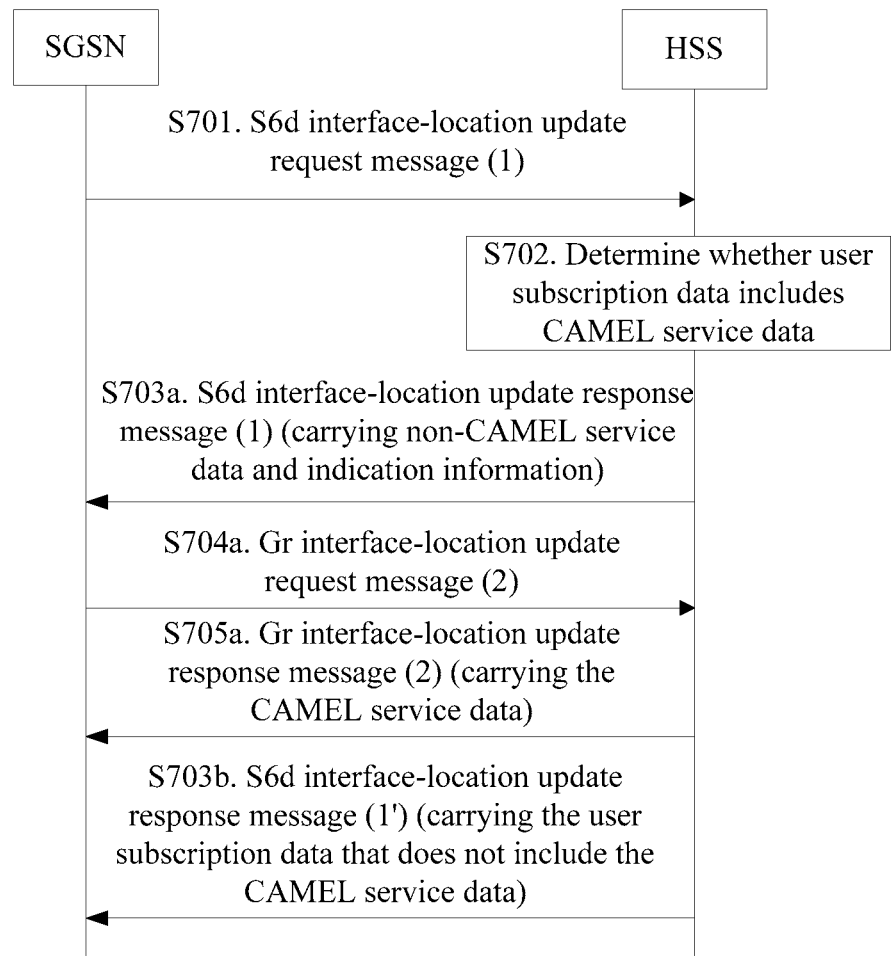
FIG. 7 is another signaling flowchart of a method for sending user subscription data from an HSS side to an SGSN side according to an embodiment of the present disclosure.

FIG. 7 shows a signaling flowchart of another method for sending user subscription data from an HSS side to an SGSN side in the technical solutions of an embodiment of the present disclosure. The method may include:

Step S701: An SGSN sends a location update request message (1) to an HSS by using an S6d interface.

The SGSN requests to acquire user subscription data from the HSS by sending the location update request message (1) to the HSS.

Preferably, the SGSN indicates, in the location update request message (1), whether the SGSN supports a CAMEL service.

Step S702: When the HSS receives the location update request message (1) sent by the SGSN, the HSS determines whether user subscription data includes CAMEL service data.

If the current SGSN supports the CAMEL service, it indicates that the user subscription data to be sent to the SGSN may include the CAMEL service data or may not include the CAMEL service data. The HSS needs to further determine whether the user subscription data to be sent to the SGSN includes the CAMEL service data. If the current SGSN does not support the CAMEL service, it indicates that the user subscription data to be sent to the SGSN does not include the CAMEL service data. In this case, the HSS may directly send the user subscription data to the SGSN by using the S6d interface.

It should be noted that the technical solutions of the embodiments of the present disclosure are concerned only about the case in which the SGSN supports the CAMEL service.

Step S703a: When the user subscription data includes the CAMEL service data, the HSS sends a location update response message (1) to the SGSN by using the S6d interface, where the location update response message (1) carries indication information and non-CAMEL service data in the user subscription data.

The indication information is used to indicate that the user subscription data includes the CAMEL service data, and instruct the SGSN to re-send a location update request message by using a Gr interface.

Step S704a: The SGSN re-sends a location update request message (2) by using a Gr interface.

Step S705a: The HSS sends a location update response message (2) to the SGSN by using the Gr interface after receiving the location update request message (2) re-sent by the SGSN, where the location update response message (2) carries the CAMEL service data in the user subscription data.

Step S703b: When the user subscription data does not include the CAMEL service data, the HSS sends a location update response message (1') to the SGSN by using the S6d interface, where the location update response message (1') carries the user subscription data.

In a possible implementation manner, that the HSS sends the CAMEL service data in the user subscription data to the SGSN by using the Gr interface is that the HSS sends an insert subscriber data request message to the SGSN by using the Gr interface, where the insert subscriber data request message carries the CAMEL service data in the user subscription data; and the SGSN sends an insert subscriber data response message to the HSS after receiving the insert subscriber data request message sent by the HSS. The HSS may send the user subscription data by using multiple insert subscriber data request messages. After the HSS receives a last insert subscriber data response message, a data sending procedure ends.

In addition, when CAMEL service data in the HSS is updated, the HSS sends insert subscriber data request information that carries updated CAMEL service data to the SGSN by using the Gr interface, so that the SGSN updates the CAMEL service data.

In this embodiment, the HSS may record a data sending situation in the process of sending user subscription data, and determine, according to the recorded data sending situation, that which part of data is sent and which part of data is not sent. Specifically, after the HSS receives the location update request message re-sent by the SGSN, the HSS may know, according to recorded information, that the non-CAMEL service data in the user subscription data is sent, but the CAMEL service data in the user subscription data is not sent; therefore, the HSS only needs to send the CAMEL data by using the Gr interface. In another possible implementation manner, the HSS may not record a data sending situation. When the SGSN re-sends the location update request message to the SGSN, the location update request message may carry indication information indicating that only the CAMEL service data is requested. After the HSS receives the location update request message, the HSS may know, according to the indication information, that only the CAMEL service data needs to be sent to the SGSN.

In the method for sending user subscription data from an HSS side to an SGSN side according to the embodiment of the present disclosure, an HSS first receives, by using an S6d interface, a location update request message sent by an SGSN. Considering that the user subscription data may include CAMEL service data or may not include CAMEL service data, different interfaces may be used in different cases, to fully utilize the S6d interface, after the message is received and before the user subscription data is sent, the HSS first determines whether the user subscription data includes the CAMEL service data, and then sends the user subscription data by selectively using a Gr interface or the S6d interface for different cases. That is, in a case in which the user subscription data does not include the CAMEL service data, the user subscription data is sent by using the S6d interface; in a case in which the user subscription data includes the CAMEL service data, non-CAMEL service data in the user subscription data is sent by using the S6d interface, and the CAMEL service data in the user subscription data is sent by using the Gr interface. Apparently, in this manner, utilization of the S6d interface is greatly improved, and the S6d interface can be fully utilized. Further, some optimization procedures defined on the S6d interface for scenarios in which an SGSN and an MME are integrated can also be implemented.

Figure 8:
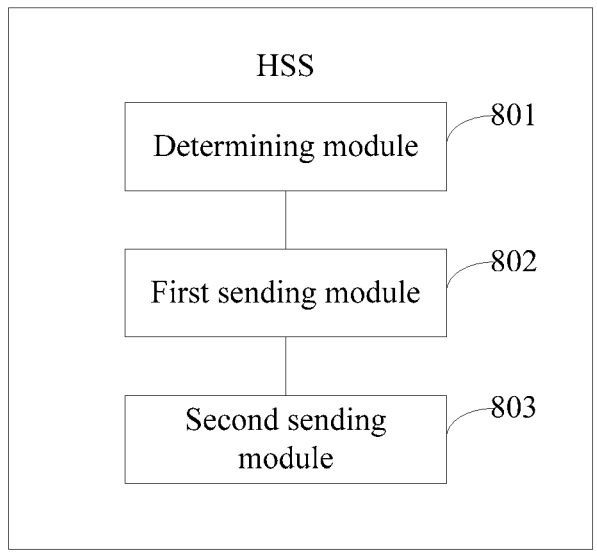
FIG. 8 is a schematic structural diagram of an HSS according to an embodiment of the disclosure.

Referring to FIG. 8, FIG. 8 is a schematic structural diagram of an HSS according to an embodiment of the disclosure. The HSS may include a determining module 801, a first sending module 802, and a second sending module 803.

The determining module 801 is configured to: when the HSS receives, by using an S6d interface, a request sent by an SGSN for acquiring user subscription data, determine whether the user subscription data includes CAMEL service data.

The first sending module 802 is configured to: when the user subscription data includes the CAMEL service data, send the user subscription data to the SGSN by using a Gr interface, or send non-CAMEL service data in the user subscription data by using the S6d interface and send the CAMEL service data in the user subscription data by using a Gr interface to the SGSN.

The second sending module 803 is configured to: when the user subscription data does not include the CAMEL service data, send the user subscription data to the SGSN by using the S6d interface.

The HSS provided by the embodiment of the present disclosure first receives, by using an S6d interface, a request sent by an SGSN for acquiring user subscription data. Considering that the user subscription data may include CAMEL service data or may not include CAMEL service data, and different interfaces may be used in different cases, to fully utilize the S6d interface, after the request is received and before the user subscription data is sent, the HSS first determines whether the user subscription data includes the CAMEL service data, and then sends the user subscription data by selectively using a Gr interface or the S6d interface for different cases. That is, in a case in which the user subscription data does not include the CAMEL service data, the user subscription data is sent by using the S6d interface; in a case in which the user subscription data includes the CAMEL service data, the user subscription data is sent by using the Gr interface, or non-CAMEL service data in the user subscription data is sent by using the S6d interface. Apparently, in this manner, utilization of the S6d interface is greatly improved, and the S6d interface can be fully utilized. Further, some optimization procedures defined on the S6d interface for scenarios in which an SGSN and an MME are integrated can also be implemented.

In the foregoing embodiment, the request for acquiring user subscription data may be a location update request message. There are multiple manners for implementing the first sending module 802.

In a possible implementation manner, the first sending module 802 may include a first sending submodule and a second sending submodule.

The first sending submodule is configured to send a location update response message to the SGSN by using the S6d interface, where the location update response message carries indication information, where the indication information is used to indicate that the user subscription data includes the CAMEL service data.

The second sending submodule is configured to: after the location update response message is sent, send the user subscription data that includes the CAMEL service data to the SGSN by using the Gr interface.

In the foregoing embodiment, the indication information carried in the location update response message may be further used to instruct the SGSN to re-send a location update request message by using the Gr interface. In this case, the second sending submodule may further include a first sending unit.

The first sending unit is configured to: after the first sending submodule sends the location update response message, if the HSS receives the location update request message re-sent by the SGSN by using the Gr interface, send the user subscription data that includes the CAMEL service data to the SGSN by using the Gr interface.

In another possible implementation manner, the first sending module 802 may include a third sending submodule and a fourth sending submodule.

The third sending submodule is configured to send a location update response message to the SGSN by using the S6d interface, where the location update response message carries the non-CAMEL service data in the user subscription data and indication information, where the indication information is used to indicate that the user subscription data includes the CAMEL service data.

The fourth sending submodule is configured to: after the location update response message is sent, send the CAMEL service data in the user subscription data to the SGSN by using the Gr interface.

In the foregoing embodiment, the indication information carried in the location update response message is further used to instruct the SGSN to re-send a location update request message by using the Gr interface. In this case, the fourth sending submodule includes a second sending unit.

The second sending unit is configured to: after the third sending submodule sends the location update response message, if the HSS receives the location update request message re-sent by the SGSN by using the Gr interface, send the CAMEL service data in the user subscription data to the SGSN by using the Gr interface.

Optionally, the location update request message re-sent by the SGSN by using the Gr interface further carries indication information used to indicate that only the CAMEL service data in the user subscription data is requested.

Figure 9:
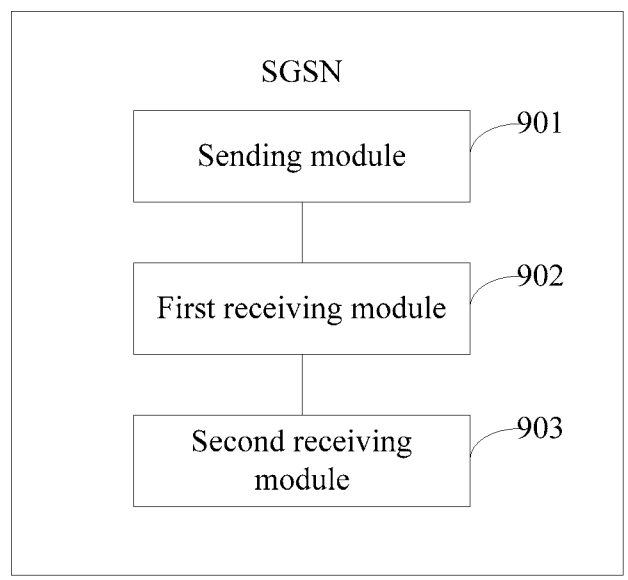
FIG. 9 is a schematic structural diagram of an SGSN according to an embodiment of the present disclosure.

Referring to FIG. 9, FIG. 9 is a schematic structural diagram of an SGSN according to an embodiment of the disclosure. The SGSN may include a sending module 901, a first receiving module 902, and a second receiving module 903.

The sending module 901 is configured to send, by using an S6d interface, a request for acquiring user subscription data to an HSS.

The first receiving module 902 is configured to: when the HSS determines that the user subscription data includes CAMEL service data, receive the user subscription data by using a Gr interface, or receive non-CAMEL service data in the user subscription data by using the S6d interface and receive the CAMEL service data in the user subscription data by using a Gr interface.

The second receiving module 903 is configured to: when the HSS determines that the user subscription data does not include the CAMEL service data, receive the user subscription data by using the S6d interface.

The SGSN provided by the embodiment of the present disclosure sends, by using an S6d interface, a request for acquiring user subscription data to an HSS. Considering that the user subscription data may include CAMEL service data or may not include CAMEL service data, and different interfaces may be used in different cases, to further fully utilize the S6d interface, in a case in which the user subscription data does not include the CAMEL service data, the user subscription data is received by using the S6d interface; in a case in which the user subscription data includes the CAMEL service data, the user subscription data is received by using a Gr interface, or non-CAMEL service data in user subscription data is received by using the S6d interface. Apparently, in this manner, utilization of the S6d interface is greatly improved, and the S6d interface can be fully utilized. Further, some optimization procedures defined on the S6d interface for scenarios in which an SGSN and an MME are integrated can also be implemented.

In the foregoing embodiment, the request for acquiring user subscription data may be a location update request message. There are multiple manners for implementing the first receiving module 902.

In a possible implementation manner, the first receiving module 902 may include a first receiving submodule and a second receiving submodule.

The first receiving submodule is configured to receive, by using the S6d interface, a location update response message sent by the HSS, where the location update response message carries indication information, where the indication information is used to indicate that the user subscription data includes the CAMEL service data.

The second receiving submodule is configured to receive, by using the Gr interface, the user subscription data that includes the CAMEL service data and is sent by the HSS.

In the foregoing embodiment, the indication information carried in the location update response message is further used to instruct the SGSN to re-send a location update request message by using the Gr interface. In this case, the first receiving module further includes a fifth sending submodule.

The fifth sending submodule is configured to: after the location update response message is received, re-send the location update request message to the HSS by using the Gr interface.

In another possible implementation manner, the first receiving module 902 may include a third receiving submodule and a fourth receiving submodule.

The third receiving submodule is configured to receive, by using the S6d interface, a location update response message sent by the HSS, where the location update response message carries the non-CAMEL service data in the user subscription data and indication information, where the indication information is used to indicate that the user subscription data includes the CAMEL service data.

The fourth receiving submodule is configured to receive, by using the Gr interface, the CAMEL service data that is included in the user subscription data and sent by the HSS.

Optionally, the indication information carried in the location update response message in the foregoing embodiment is further used to instruct the SGSN to re-send a location update request message by using the Gr interface. In this case, the first receiving module further includes a sixth sending submodule.

The sixth sending submodule is configured to: after the location update response message is received, re-send the location update request message to the HSS by using the Gr interface.

Optionally, the location update request message re-sent by the sixth sending submodule to the HSS by using the Gr interface further carries indication information used to indicate that only the CAMEL service data is requested.

It should be noted that the embodiments in this specification are all described in a progressive manner, each embodiment focuses on a difference from other embodiments, and for same or similar parts in the embodiments, reference may be made to these embodiments. An apparatus or system embodiment is basically similar to a method embodiment, and therefore is described briefly; for related parts, reference may be made to partial descriptions in the method embodiment.

It should further be noted that in this specification, relational terms such as first and second are only used to distinguish one entity or operation from another, and do not necessarily require or imply that any actual relationship or sequence exists between these entities or operations. Moreover, the terms "include", "include", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

With the foregoing description of the disclosed embodiments, a person skilled in the art can implement or use the present disclosure. Various modifications to the embodiments are obvious to the person skilled in the art, and general principles defined in this specification may be implemented in other embodiments without departing from the scope of the present disclosure. Therefore, the present disclosure will not be limited to the embodiments described in this specification but extends to the widest scope that complies with the principles and novelty disclosed in this specification.

What is claimed is:

1. A method for sending user subscription data, comprising:
   when a Home Subscriber Server (HSS) receives, by using an S6d interface, a request sent by a Serving GPRS Supporting Node (SGSN) for acquiring user subscription data, determining, by the HSS, whether the user subscription data comprises Customized Applications for Mobile network Enhanced Logic (CAMEL) service data;
   when the user subscription data comprises the CAMEL service data, sending, by the HSS, the user subscription data to the SGSN by using a Gr interface, or sending non-CAMEL service data in the user subscription data by using the S6d interface and sending the CAMEL service data in the user subscription data by using a Gr interface to the SGSN; and
   when the user subscription data does not comprise the CAMEL service data, sending, by the HSS, the user subscription data to the SGSN by using the S6d interface.

2. The method according to claim 1, wherein the request for acquiring user subscription data is a location update request message.

3. The method according to claim 2, wherein the sending, by the HSS, the user subscription data to the SGSN by using a Gr interface, comprises:
   sending, by the HSS, a location update response message to the SGSN by using the S6d interface, wherein the location update response message carries indication information, wherein the indication information is used to indicate that the user subscription data comprises the CAMEL service data; and
   sending, by the HSS, the user subscription data that comprises the CAMEL service data to the SGSN by using the Gr interface after sending the location update response message.

4. The method according to claim 3, wherein the indication information carried in the location update response message is further used to instruct the SGSN to re-send a location update request message by using the Gr interface; and
   the sending, by the HSS, the user subscription data that comprises the CAMEL service data to the SGSN by using the Gr interface after sending the location update response message, comprises:
   after the location update response message is sent, when the HSS receives the location update request message re-sent by the SGSN by using the Gr interface, sending the user subscription data that comprises the CAMEL service data to the SGSN by using the Gr interface.

5. The method according to claim 2, wherein the sending, by the HSS, non-CAMEL service data in the user subscription data by using the S6d interface and sending the CAMEL service data in the user subscription data by using a Gr interface to the SGSN, comprises:
   sending, by the HSS, a location update response message to the SGSN by using the S6d interface, wherein the location update response message carries the non-CAMEL service data in the user subscription data and indication information, wherein the indication information is used to indicate that the user subscription data comprises the CAMEL service data; and
   sending, by the HSS, the CAMEL service data in the user subscription data to the SGSN by using the Gr interface after sending the location update response message.

6. The method according to claim 5, wherein the indication information carried in the location update response message is further used to instruct the SGSN to re-send a location update request message by using the Gr interface; and
   the sending, by the HSS, the CAMEL service data in the user subscription data to the SGSN by using the Gr interface after sending the location update response message, comprises:
   after the location update response message is sent, when the HSS receives the location update request message re-sent by the SGSN by using the Gr interface, sending, by the HSS, the CAMEL service data in the user subscription data to the SGSN by using the Gr interface.

7. The method according to claim 6, wherein the location update request message re-sent by the SGSN by using the Gr interface further carries indication information used to indicate that only the CAMEL service data in the user subscription data is requested.

8. A method for receiving user subscription data, comprising:
   sending, by a Serving GPRS Supporting Node (SGSN) by using an S6d interface, a request for acquiring user subscription data to a Home Subscriber Server (HSS);
   when the HSS determines that the user subscription data comprises Customized Applications for Mobile network Enhanced Logic (CAMEL) service data, receiving, by the SGSN, the user subscription data by using a Gr interface, or receiving non-CAMEL service data in the user subscription data by using the S6d interface and receiving the CAMEL service data in the user subscription data by using a Gr interface; and
   when the HSS determines that the user subscription data does not comprise the CAMEL service data, receiving, by the SGSN, the user subscription data by using the S6d interface.

9. The method according to claim 8, wherein the request for acquiring user subscription data is a location update request message.

10. The method according to claim 9, wherein the receiving, by the SGSN, the user subscription data by using a Gr interface, comprises:
    receiving, by the SGSN using the S6d interface, a location update response message sent by the HSS, wherein the location update response message carries indication information, wherein the indication information is used to indicate that the user subscription data comprises the CAMEL service data; and receiving, by the SGSN using the Gr interface, the user subscription data that comprises the CAMEL service data and is sent by the HSS.

11. The method according to claim 10, wherein the indication information carried in the location update response message is further used to instruct the SGSN to re-send a location update request message by using the Gr interface; and the method further comprises:

after receiving the location update response message, re-sending, by the SGSN, the location update request message to the HSS by using the Gr interface.

12. The method according to claim 9, wherein the receiving, by the SGSN, non-CAMEL service data in the user subscription data by using the S6d interface and receiving the CAMEL service data in the user subscription data by using a Gr interface, comprises:

receiving, by the SGSN by using the S6d interface, a location update response message sent by the HSS, wherein the location update response message carries the non-CAMEL service data in the user subscription data and indication information, wherein the indication information is used to indicate that the user subscription data comprises the CAMEL service data; and receiving, by the SGSN by using the Gr interface, the CAMEL service data that is comprised in the user subscription data and sent by the HSS.

13. The method according to claim 12, wherein the indication information carried in the location update response message is further used to instruct the SGSN to re-send a location update request message by using the Gr interface; and the method further comprises:

after receiving the location update response message, re-sending, by the SGSN, the location update request message to the HSS by using the Gr interface.

14. The method according to claim 13, wherein the location update request message re-sent by the SGSN to the HSS by using the Gr interface carries indication information used to indicate that only the CAMEL service data is requested.

15. A Home Subscriber Server (HSS), comprising:

an S6d interface and a Gr interface;

a memory storage comprising instructions; and one or more processors in communication with the memory, wherein the one or more processors execute the instructions to: receive, by using the S6d interface, a request sent by a Serving GPRS Supporting Node (SGSN) for acquiring user subscription data, determine whether the user subscription data comprises Customized Applications for Mobile network Enhanced Logic (CAMEL) service data;

when the user subscription data comprises the CAMEL service data, send the user subscription data to the SGSN by using the Gr interface, or send non-CAMEL service data in the user subscription data by using the S6d interface and send the CAMEL service data in the user subscription data by using the Gr interface to the SGSN; and when the user subscription data does not comprise the CAMEL service data, send the user subscription data to the SGSN by using the S6d interface.

16. The HSS according to claim 15, wherein the request for acquiring user subscription data is a location update request message.

17. The HSS according to claim 16, wherein the one or more processors further execute the instructions to:

send a location update response message to the SGSN by using the S6d interface, wherein the location update response message carries indication information, wherein the indication information is used to indicate that the user subscription data comprises the CAMEL service data; and after the location update response message is sent, send the user subscription data that comprises the CAMEL service data to the SGSN by using the Gr interface.

18. A Serving GPRS Supporting Node (SGSN), comprising:

an S6d interface and a Gr interface;

a memory storage comprising instructions; and one or more processors in communication with the memory, wherein the one or more processors execute the instructions to: send, by using the S6d interface, a request for acquiring user subscription data to a Home Subscriber Server (HSS);

when the HSS determines that the user subscription data comprises Customized Applications for Mobile network Enhanced Logic (CAMEL) service data, receive the user subscription data by using the Gr interface, or receive non-CAMEL service data in the user subscription data by using the S6d interface and receive the CAMEL service data in the user subscription data by using the Gr interface; and when the HSS determines that the user subscription data does not comprise the CAMEL service data, receive the user subscription data by using the S6d interface.

19. The SGSN according to claim 18, wherein the request for acquiring user subscription data is a location update request message.

20. The SGSN according to claim 19, wherein the one or more processors further execute the instructions to:

receive, by using the S6d interface, a location update response message sent by the HSS, wherein the location update response message carries indication information, wherein the indication information is used to indicate that the user subscription data comprises the CAMEL service data; and receive, by using the Gr interface, the user subscription data that comprises the CAMEL service data and is sent by the HSS.

* * * * *